Dec. 30, 1969 R. KMECO 3,486,702
PULPING APPARATUS
Filed Oct. 25, 1967 2 Sheets-Sheet 1
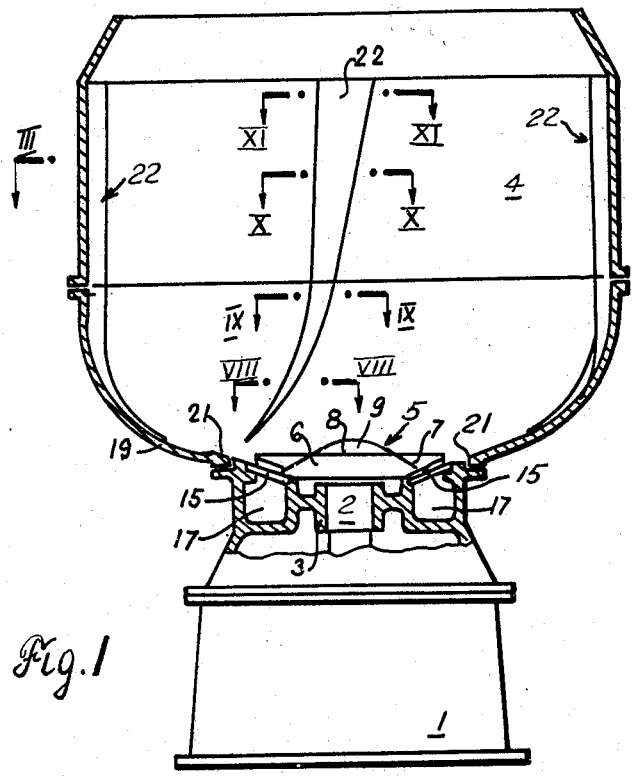
Fig. 1
Fig. 3
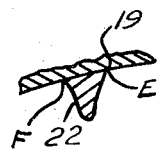
Fig. 8
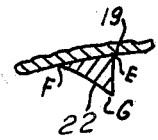
Fig. 9
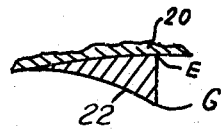
Fig. 10
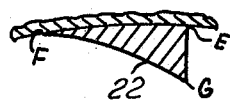
Fig. 11
Rudolf Kmeco
INVENTOR.

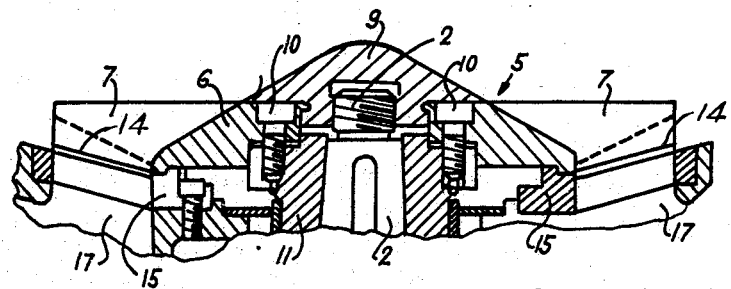
Fig. 2
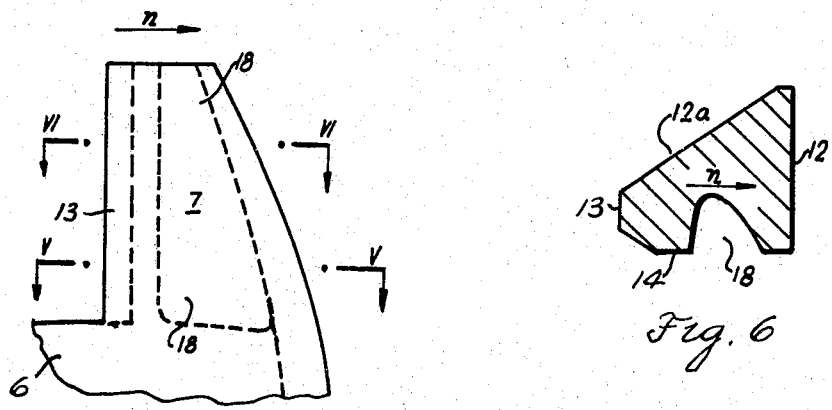
Fig. 4
Fig. 6
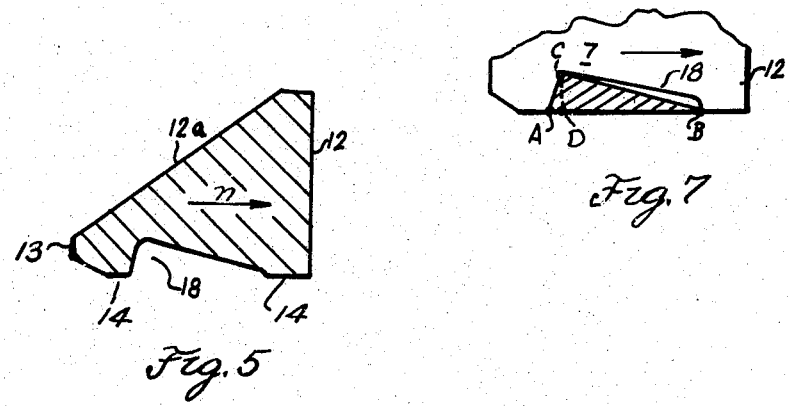
Fig. 5
Fig. 7
Rudolf Kmeco
INVENTOR.

United States Patent Office 3,486,702
Patented Dec. 30, 1969

3,486,702
PULPING APPARATUS
Rudolf Kmeco, Litovel, Czechoslovakia, assignor to PAPCEL, strojirny pro prumysl celulosy a papiru narodni podnik, Litovel, Czechoslovakia
Filed Oct. 25, 1967, Ser. No. 677,904
Claims priority, application Czechoslovakia, Nov. 1, 1966, 6,914/66, 6,915/66
Int. Cl. B02c 7/00, 13/09
U.S. Cl. 241—46.17          11 Claims

ABSTRACT OF THE DISCLOSURE

A pulper for waste paper stock has a rotor with vanes. The bottom face of each vane is provided with a recess whose width decreases and whose depth increases in a radially outward direction. The bottom faces of the vanes are located in a frusto-conical surface and adjacent a frusto-conical surface of a stator. The tub of the pulper is provided with deflecting projections which intensify the mixing effect. Gentle but intensive processing of stock is achieved in the device.

BACKGROUND OF THE INVENTION

The present invention relates to an apparatus for pulping fibrous material such as waste paper stock, dried sheets of cellulose etc. for further use in the manufacture of paper, paperboard, molded pulp articles and similar products.

The invention relates especially to a pulper whose tub is provided with a rotor for creating circulatory movement of pulped stock in the tube and for imparting hydrodynamical forces to the material for an intensive but gentle disintegration of the stock.

The rotors of known pulpers cooperate with a stator or bedplate, usually grooved and mounted in the bottom wall of the pulper tub. The cooperation of the rotor and the bedplate results in mechanical treatment of the stock in addition to the hydrodynamical effects.

One known pulper has a rotor with blades or vanes positioned close to a flat, grooved, annular bedplate. The leading edge of each vane is essentially flat and inclined toward the working surface of the bedplate so that the leading edge surface of the vane forces the stock toward the working surface of the bedplate. The stock is subjected to a rubbing action in a gap between the bottom face of the vane and the surface of the bedplate. This type of pulper can damage the fibers of waste paper or similar material by tearing the pieces of stock which are not small enough to pass between the rotor vane and the bedplate.

Another known type of pulping apparatus has a rotor with vanes of different height. The bottom faces of all vanes define a common frusto-conical surface which is parallel to the frusto-conical surface of a cooperating stator. The leading edge surface of each vane is obliquely inclined to the plane of rotation of the rotor while the trailing face of each vane is substantially perpendicular to the plane of rotation. The vanes lift the stock from the stator area in order to protect the pieces of material that are not small enough to pass between the vanes and the stator. The bottom face of each vane has a radially arranged recess or channel for additional hydrodynamical action on the pieces that have passed between the vane and the stator. The channel is of the same cross-section along the vane and is open at the outer end of the vane. This type of pulper processes the stock in a gentle manner but, due to the upwardly sloping leading surfaces of the vanes, it removes not only large pieces from the stator area but also smaller particles that should be processed under the vanes. In other words, the energy used in taking the small particles out of the stator area instead of allowing them to pass under the vanes into the channels is lost. The shape of the recess or channel does not assure thorough processing of the small particles because centrifugal force throw the particles out of the channel with minimum defibering or pulping action in this area. Thus, the second type of pulper solves the problem of gentle processing of the stock, but the processing is less intensive than in the first mentioned known apparatus.

SUMMARY OF THE INVENTION

It is a primary object of the present invention to provide a pulping apparatus which provides both intensive and gentle processing of the fiber stock.

In one of its aspects, the invention provides a pulping apparatus equipped with a container adapted to receive the stock to be pulped. A rotor is mounted in the container for rotation about a substantially vertical axis. It has several vanes which project radially outwardly from a central body portion. A bottom face of each vane which connects the circumferentially spaced leading and trailing faces of the vane and which is directed toward the bottom wall of the container has a recess which is elongated in an approximately radial direction and whose width decreases in a radially outward direction. A bedplate is mounted on the bottom wall of the container subjacent the rotor and has substantially radial ribs and grooves between the ribs. The ridges of the ribs are located in a common conical surface about the axis of rotation of the rotor.

The leading faces of the rotor vanes are substantially perpendicular to the plane of rotation of the rotor. The bottom faces of the vanes are substantially parallel to the surface in which the ridges of the ribs are located. These bottom faces and the ridges of the bedplate ribs define gaps during the rotation of the rotor.

BRIEF DESCRIPTION OF THE DRAWINGS

FIG. 1 is a view partly in side elevation and partly in section of a pulper according to this invention;
FIG. 2 is an enlarged view of a detail of FIG. 1;
FIG. 3 is a plan view of the pulper in section on the line III—III of FIG. 1;
FIG. 4 is an enlarged partial plan view of a rotor vane;
FIG. 5 is a view in section on the line V—V of FIG. 4;
FIG. 6 is a view in section on the line VI—VI of FIG. 4;
FIG. 7 is a partial view in section similar to that of FIG. 5 indicating the geometry of the preferred shape of the vane recess;
FIG. 8 to FIG. 11 inclusive are enlarged sections taken on the lines VIII—VIII, IX—IX, X—X, XI—XI, respectively, in FIG. 1.

DESCRIPTON OF THE PREFERRED EMBODIMENT

Mounted within a base 1 (FIG. 1) is an electric drive motor whose shaft 2 extends through a bearing 3 into the interior of a tub 4. The upper end of the shaft 2 carries a rotor 5.

The rotor 5 consists of a body 6 (FIG. 2) of substantially frusto-conical shape and of vanes 7 and is cast unit. The top 8 of the body 6 is covered by a cap 9 threadedly mounted on the shaft 2. The cap 9 protects the screws 10 which attach the body 6 to a sleeve 11 keyed on the shaft 2.

As best seen in FIG. 4, the leading surface 12 of each vane 7 is curved while the trailing dege 13 is straight and radial to the axis of rotation. The bottom faces 14 of all vanes 7 lie in a common conical surface which slopes downward toward the axis.

As seen in FIGS. 5 and 6, the leading surface 12 is substantially perpendicular to the plane of rotation of the rotor. The top face 12a of each vane 7 slopes downward to the trailing edge 13.

Subjacent the vanes 7 is an annular stator or bedplate 15 which is provided with radial grooves 16. The grooves 16 are downwardly open and connect the interior of the tub 4 with an annular channel 17 for flow of the pulped stock from the pulper. The bedplate 15 has radial ribs between the grooves 15. The annular upper surface of the bedplate 15 is defined by the ridges of the ribs and is parallel to the conical surface in which the bottom faces 14 of the vanes 7 are located so that the ridges and bottom faces axially bound gaps between the bedplate 15 and the vanes 7, each gap being of uniform width.

Each of the vanes 7 is provided with a recess 18 in its bottom face. As shown in FIGS. 5 and 6, the recess 18 is of substantially triangular cross-section, the width of the recess 18, that is the distance A–B as indicated in FIG. 7, decreases in a direction radially outwardly of the axis. The axial depth C–D of the recess increases in the same direction.

The tub 4 is made of stainless steel and has a bottom wall 19 and a vertical side wall 20 of cylindrical shape. As shown in FIG. 1, an edge 21 of the bottom wall 19 is fastened to the bedplate 15.

The walls of the tub 4 are provided with four elongated deflecting projections 22 which are uniformly distributed about the axis of rotation of the rotor 5. As shown in FIG. 1, each projection 22 rises from its bottom end near the stationary bedplate 15, with increasing slope in an oblique upward direction and in the direction as in the sense of rotation of the rotor 5.

When sectioned in horizontal planes (see lines VIII—VIII to XI—XI of FIG. 1), the projections 22 are of a substantially triangular shape with apexes of said sections being indicated by capital letters E, F, G in FIGS. 8, 9, 10, 11. From the bottom end of the projection 22 upward, there is an increase in the length of the base E–F of the triangle and of one side F–G, while the other side G–E remains substantially unchanged in its length. The base E–F of the triangle is contiguous to the wall of the tub.

During operation of the pulper, the rotor 5 rotates in the direction of the arrow $n$ and vigorously agitates the stock in the tub 4.

The rotor 5 draws a stream of the stock downward in the center part of the tub 4. The stock is fed toward the cap 9 by which it is deflected toward the bedplate 15, where the leading surfaces 12 of the vanes 7 force the stock to flow outward from the rotor area toward the bottom ends of the deflecting projections 22. Due to the gradually increasing slope of the projections 22, the initially circumferential movement of the stock changes gradually into an axial upward movement, and the stock is forced to flow to the center part of the tub 4 at the upper ends of the projections 22. The above process creates a phenomenon that could be compared to a lifting of the stock from the outer area of the rotor 5. This vortex movement assists in removing comparatively large particles from the gaps between the rotor and bedplate while the smaller particles are forced to flow toward the bedplate 15 and into the gap between the bottom faces 14 of the vanes 7 and the bedplate 15. In the area of the recesses 18 the stock is subjected to intensive hydrodynamical forces which result in thorough pulping. The intensity of the hydrodynamical effects is increased by the change in the cross-section of each recess 18 from a broad and shallow form at the body 6 to a narrow and deep form at the open outer end. Thus, the stock cannot escape out of the recess 18 as easily as from a channel having parallel walls. The narrowing space between the side walls of the recess 18 causes the stock to change its direction of movement thus imparting a further hydrodynamical effect to obtain a thorough pulping. Because of the increasing depth of the recess 18, the flow section remains of the same magnitude whereby clogging of the recess 18 by the stock is prevented.

A substantial part of the stock that has passed into the recesses 18 is forced through the grooves 16 into the annular channel 17 and removed from the pulper.

If a solid bedplate with ribs is used the stock is removed through a perforated annular screen (not shown) in the bottom wall 19.

What is claimed is:
1. A pulping apparatus comprising, in combination:
    (a) a container adapted to receive stock to be pulped and having a bottom wall and a side wall rising from said bottom wall;
    (b) a rotor mounted in said container for rotation about a substantially vertical axis, said rotor including a central body portion and a plurality of vanes projecting from said body portion in respective radially outward directions,
        (1) each vane having a leading face, a trailing face spaced from said leading face in the direction of rotation of the rotor, a bottom face and a top face, said bottom and top faces connecting said leading and trailing faces, and said bottom face being directed toward said bottom wall,
        (2) the bottom face of each vane being formed with a recess elongated in a substantially radial direction and decreasing in width in a radially outward direction; and
    (c) a bedplate mounted on said bottom wall subjacent said rotor, said bedplate being formed with a plurality of substantially radial ribs with grooves between said ribs,
        (1) said ribs having respective ridges located in a common conical surface about said axis,
        (2) said leading faces being substantially perpendicular to the plane of rotation of said rotor,
        (3) said bottom faces being substantially parallel to said surface and axially defining gaps with said ridges during the rotation of said rotor.

2. An apparatus as set forth in claim 1, wherein said recess is open in a radially outward direction.

3. An apparatus as set forth in claim 1, wherein the axial depth of said recess increases in a radially outward direction.

4. An apparatus as set forth in claim 1, further comprising a plurality of elongated projections on said side wall uniformly spaced about said axis, each projection having a bottom end near said bedplate and extending from said bottom end obliquely upwardly and circumferentially in the direction of rotation of said rotor, the slope of said projection increasing upwardly from said bottom end.

5. An apparatus as set forth in claim 4, wherein said projection is substantially triangular in cross section, the triangle having a base and two sides, the base being contiguous to said side wall and increasing in length from said bottom end upwardly, one of said sides increasing in length from said bottom end upwardly and the other side being substantially uniform in length.

6. An apparatus as set forth in claim 1, wherein said bedplate is annular about said axis.

7. An apparatus as set forth in claim 1, wherein said grooves are open in an axial direction outward of said tub.

8. For use in a pulping container adapted to receive stock to be pulped, a rotor assembly comprising, in combination:
    (a) a rotor body having an axis and adapted to be mounted in said container for rotation about said axis in a horizontally extending plane of rotation; and
    (b) a plurality of vanes projecting from said body in respective radially outward directions,
        (1) each vane having a leading face, a trailing face spaced from said leading face in the direction of rotation of said rotor body, a top face and an axially directed bottom face, said top and bottom faces connecting said leading and trailing faces, (2) said leading faces being substantially perpendicular to said plane of rotation, and (3) the bottom face of each vane being formed with a recess elongated in a substantially radial direction.

9. An assembly as set forth in claim 8 wherein the circumferential width of said recess decreases in a radially outward direction.

10. An assembly as set forth in claim 9, wherein the axial depth of said recess increases in a radially outward direction.

11. An assembly as set forth in claim 8, wherein the axial depth of said recess increases in a radially outward direction.

References Cited

UNITED STATES PATENTS

| | | | |
|---|---|---|---|
| 2,973,153 | 2/1961 | Rich | 241—46.17 |
| 3,339,851 | 9/1967 | Felton et al. | 241—46.17 |

GERALD A. DOST, Primary Examiner

U.S. Cl. X.R.

241—69